United States Patent [19]

Lee

[11] Patent Number: 5,215,560
[45] Date of Patent: Jun. 1, 1993

[54] AIR FILTERING SYSTEM

[76] Inventor: Nam H. Lee, 8800 Forest Village Dr., Anchorage, Ak. 99502

[21] Appl. No.: 833,069

[22] Filed: Feb. 10, 1992

[51] Int. Cl.⁵ .................. B01D 47/02; B01D 45/08
[52] U.S. Cl. .......................... 55/245; 55/253; 55/255; 55/257.2; 55/357
[58] Field of Search ............. 55/244, 245, 248, 250, 55/253, 255, 256, 257.2, 257.3, 257.5, 357

[56] References Cited

U.S. PATENT DOCUMENTS

| | | |
|---|---|---|
| 176,585 | 4/1876 | Bradley. |
| 1,756,204 | 4/1930 | Linn .................. 55/248 X |
| 1,839,582 | 1/1932 | Nordhem ............... 55/248 |
| 1,920,437 | 8/1933 | Sillers ................. 55/255 X |
| 2,250,226 | 7/1941 | Juelson ................. 183/8 |
| 2,306,212 | 12/1942 | Gerstmann ............. 55/248 |
| 2,405,494 | 3/1944 | Dupuy ................. 183/10 |
| 2,551,890 | 5/1951 | Love ................... 55/248 X |
| 2,886,125 | 5/1959 | Denker ................ 55/248 X |
| 2,954,095 | 9/1960 | Brock ................. 55/255 X |
| 3,234,713 | 2/1966 | Harper et al. ........... 55/255 X |
| 3,782,080 | 1/1974 | Gallagher ............. 55/257.5 X |
| 3,876,398 | 4/1975 | Leisegang ............. 55/248 X |
| 4,121,915 | 10/1978 | Anderson ............. 55/244 X |
| 4,224,042 | 9/1980 | Garigioli ............. 55/245 X |
| 4,290,784 | 9/1981 | Rawicki .............. 55/257.2 X |
| 4,487,746 | 12/1984 | Tahiliani ............. 422/170 |
| 4,673,422 | 6/1987 | Tidwell ............... 55/248 |
| 4,678,485 | 7/1987 | Finley et al. .......... 55/244 X |
| 4,693,734 | 9/1987 | Erickson, Jr. .......... 55/248 |
| 4,784,676 | 11/1988 | Hale .................. 55/255 |
| 4,818,259 | 4/1989 | Marano ............... 55/255 X |
| 4,939,809 | 7/1990 | Park .................. 55/256 X |
| 5,030,257 | 7/1991 | Kasper et al. .......... 55/248 |
| 5,096,475 | 3/1992 | Kasper et al. .......... 55/248 |

FOREIGN PATENT DOCUMENTS

| | | | |
|---|---|---|---|
| 0969506 | 12/1950 | France .............. 55/257.3 |
| 1071680 | 9/1954 | France .............. 55/248 |
| 0736995 | 6/1980 | U.S.S.R. ............ 55/244 |
| 0797736 | 1/1981 | U.S.S.R. ............ 55/244 |
| 1291113 | 9/1972 | United Kingdom ..... 55/244 |

Primary Examiner—Robert Spitzer
Attorney, Agent, or Firm—Michael Tavella

[57] ABSTRACT

An improved air cleaning filter is disclosed. This device is primarily intended for use as an industrial vacuum cleaner, although the system can be adopted for stationary air filtering systems. The vacuum exhaust is fed into a housing that holds a quantity of water. The polluted air is then forced through the water, which traps most of the dust and dirt. As the clean air is exhausted, however, minute dirt and water particles tend to be sucked up as well. These particles are caught using a baffle structure that feed air into a plenum. A dust trap is suspended in the plenum to catch more stray particles. As this air is exhausted from the plenum, it passes through another set of baffles, which catch any remaining particles. Clean, dry air is then exhausted through a port at the rear of the housing. This system cleans the air so thoroughly, there is no need to cover the exhaust with paper filters. The device is made of high strength plastic.

11 Claims, 5 Drawing Sheets

AIR FILTERING SYSTEM

This invention relates to air filtering system and more particularly to air filtering systems using a water dust capture system adopted for use with vacuum cleaners.

BACKGROUND OF THE INVENTION

Vacuum Cleaners have long been used to pick up dirt and dust from rooms. Disposal of the dirt and dust had always been a problem. The dust is fine and tends to disperse quickly. Thus, when cleaning a collector bag, great care has to be used to prevent the collected dust and dirt from escaping. Several types of collector bags have been developed to help reduce this problem. One line of filters uses water to hold the dust particles. The vacuum pulls dust laden air through a sealed water tank, as the air passes through this water, the dust and dirt are trapped in the water. Cleaner air then vents from the tank. Supplemental paper filters are often used to trap particles that escape the water. To clean the tank, the water is simply flushed from the tank. The trapped dust is wet, making it too heavy to become airborne.

Examples of this type of design can be found in U.S. Pat. Nos. 176,585 to Bradley, 2,250,226 to Juelson, 2,405,494 to Dupuy, 3,234,713 to Harper et al., 4,487,746 to Tahiliani, 4,673,422 to Tidwell, 4,678,485 to Finley et al., 4,784,676 to Hale, and 4,818,259 to Marano. All of these patents use different configurations and components to do the same thing, i.e., to filter air through a liquid. Most of them rely on some form of supplemental paper filter to ensure adequate dust removal.

The main problem with these designs is that they are not totally effective. Trapped dust particles tend to rise to the surface of the water and float where high suction forces will draw these particles upward. Also, the air flow will sometimes atomize the water particles themselves, pulling them through the paper filters, which will reduce their effectiveness.

Although the use of water is a benefit, its value is diminished due to these problems. If one needs paper filters anyway, a dry system might be preferable to a wet system.

The present invention overcomes these problems. By utilizing a series of baffles, plus a dust collecting trap, the problems discussed above are eliminated. The baffles create enough turbulence within them to hold any dust that may have escaped from the water. They also act to reduce the force of the moving air to reduce the amount of water drawn up by atomization.

The device is generally rectangular in shape and is made of an upper section and a lower section. These sections can be separated for cleaning and refilling with water. An inlet tube is provided that channels the dust laden air from an external vacuum hose into the main water chamber. There, the dust is trapped in the water. The air is then forced upward through the water into the lower baffle units. The lower baffle units create restrictions which pull the air into the transfer chamber. This chamber pulls the air from the lower unit to the upper unit. At the top of the transfer chamber is a dust trap. This device is a conical plate that attracts any dust or water particles that may have escaped the water. The air then flows into the upper chamber, where it enters the exit baffles that act to catch any particles that may remain before the air is ejected through the exhaust port. Use of the baffles completely eliminates the need for paper filters placed at the exhaust ports. The exhaust ports emit clean, dry air. Although no paper filters are needed, a scented filter can be added, if desired, to freshen the air.

The device is constructed from lightweight materials, such as plastic. The device is also designed to be compact in shape, to permit it to be attached to a commercial upright vacuum cleaner.

It is an object of this invention to produce a vacuum operated air filter, utilizing water as a filtering agent that emits clean dry air without the need for supplemental paper filters.

It is another object of this invention to produce an air filter that emits clean air after being filtered through water, by forcing the air through a series of baffles that act to absorb airborne dust and water particles before the air is emitted from the device.

It is yet another object of the invention to produce an air filter utilizing water as a filter means to provide a conical dust trap in the air stream to capture dust and water particles from the air stream.

DETAILED DESCRIPTION OF THE INVENTION

Figure 1:
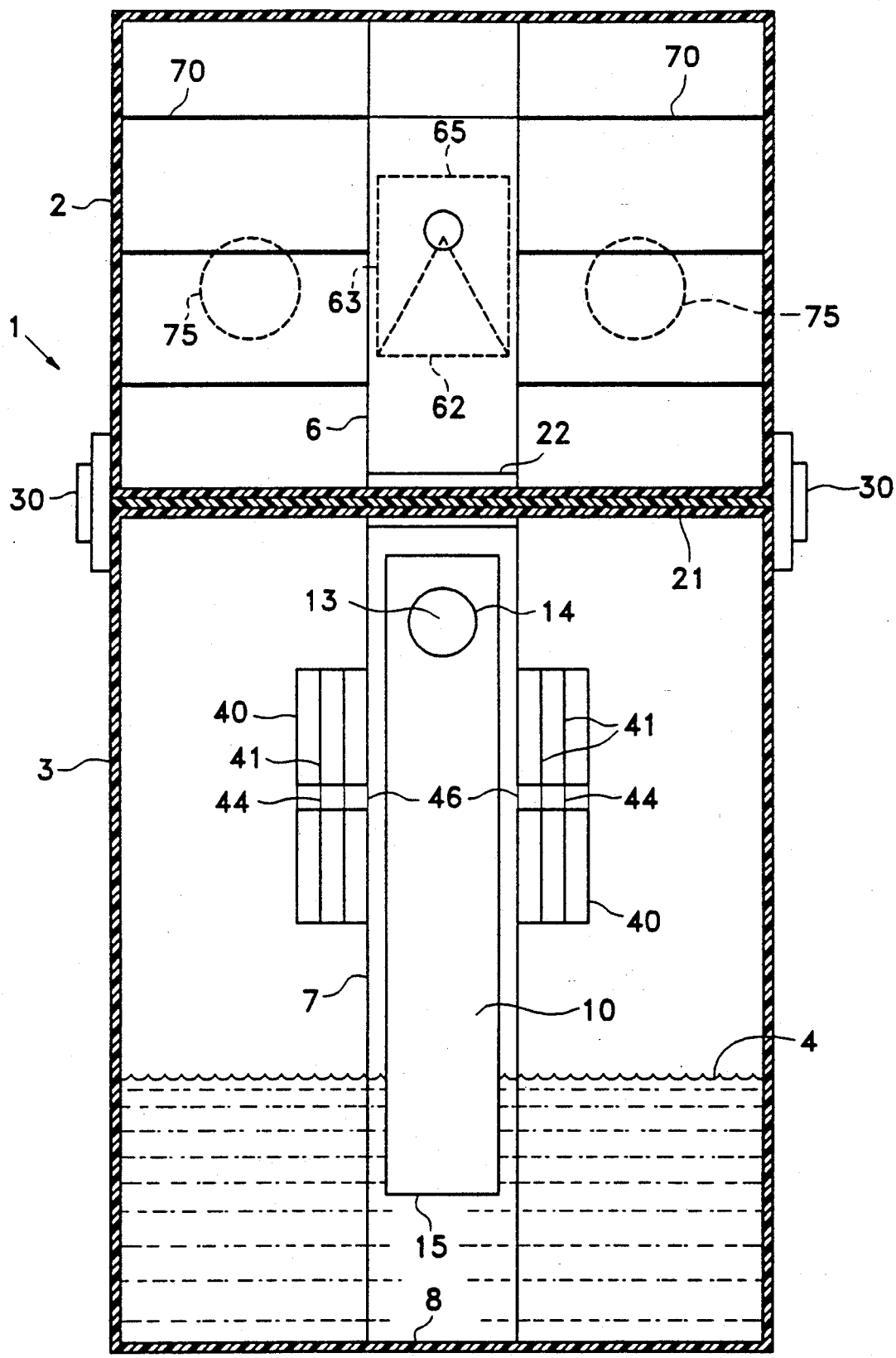
FIG. 1 is a front view of the preferred embodiment.
Figure 2:
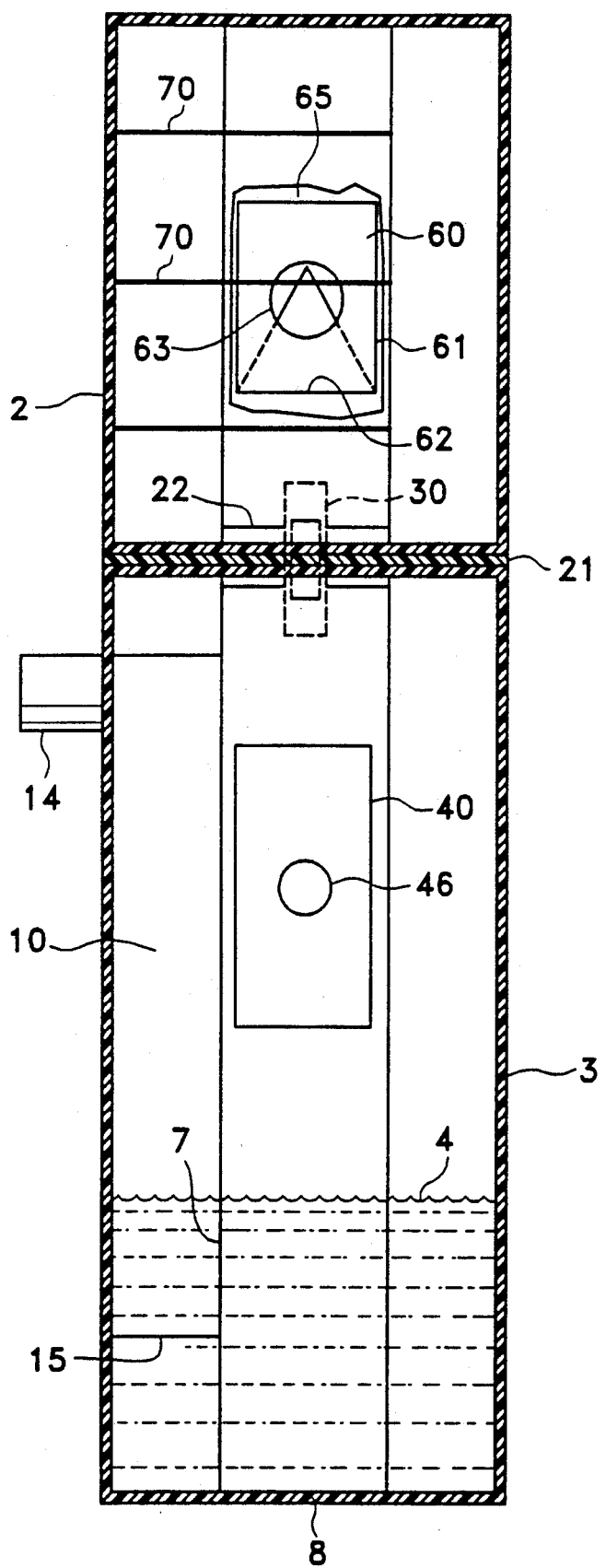
FIG. 2 is a side view of the preferred embodiment.
Figure 3:
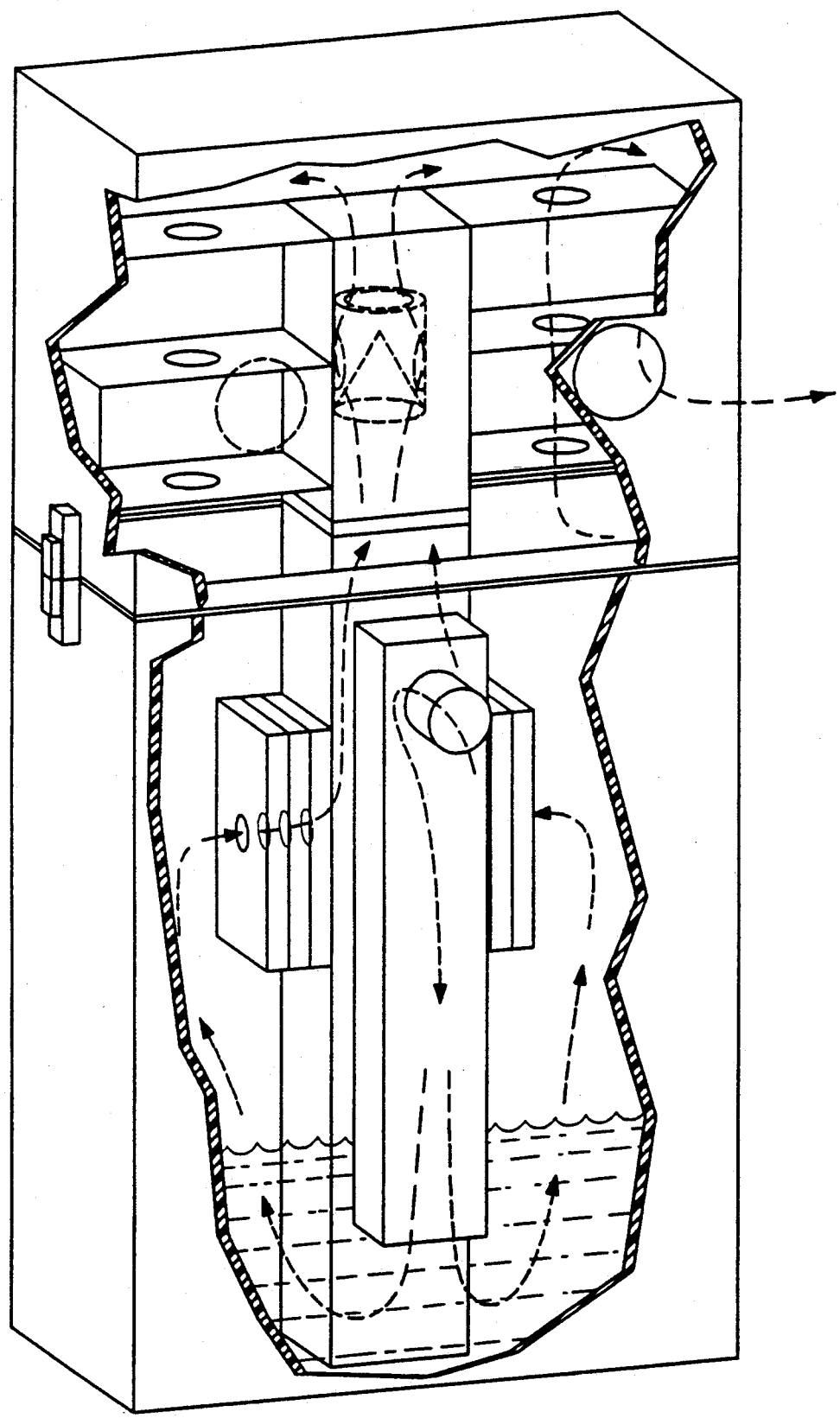
FIG. 3 is a perspective view of the preferred embodiment, showing the air flow through the device.
Figure 4:
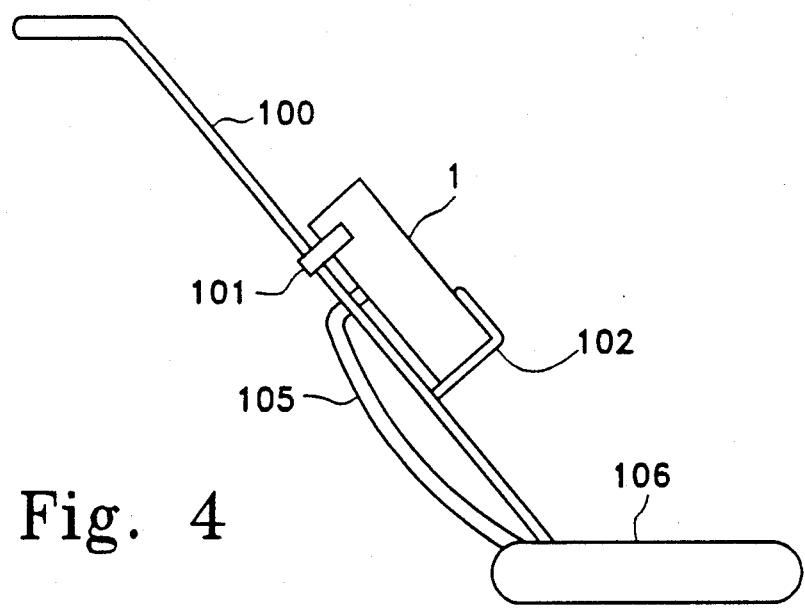
FIG. 4 is a detail view of the device mounted to a vacuum cleaner.
Figure 5:
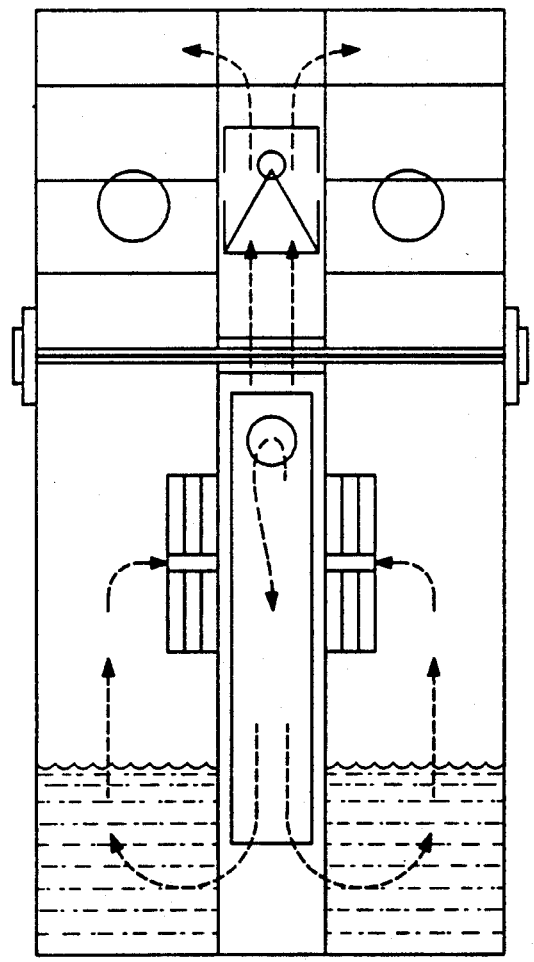
FIG. 5 is a front view of the preferred embodiment showing the air flow through the device.
Figure 6:
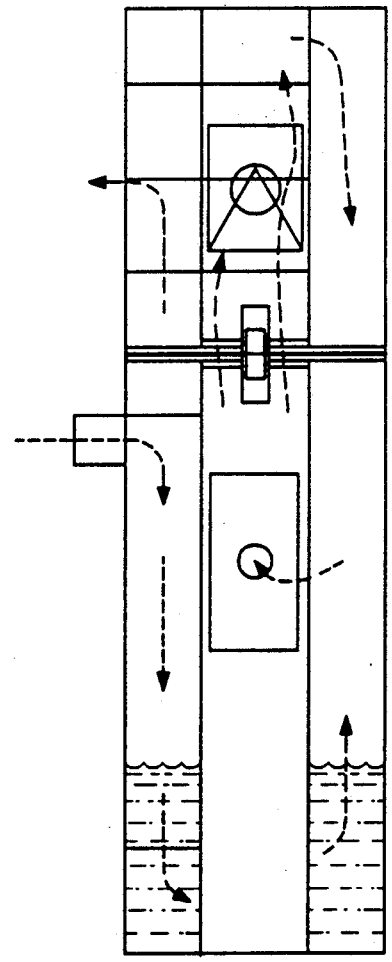
FIG. 6 is a side view of the preferred embodiment showing the air flow through the device.

Referring now to the drawings, and particularly to FIGS. 1, 2, and 4 the device consists of an outer housing 1, which is separated into two pieces for use: an upper housing 2 and a lower housing 3. The lower housing 3 is used to hold a quantity of water 4, which acts as a filter. An exhaust plenum is formed in the housing. This exhaust plenum has an upper portion 6 and a lower portion 7. The exhaust plenum is sealed to permit air to enter and exit the exhaust plenum from only the desired entry ports, which are discussed below. The lower exhaust plenum portion 7 is also sealed to prevent entry of water through the bottom of the exhaust plenum, at 8. An air intake conduit 10 is placed alongside the exhaust plenum as shown.

The air intake conduit 10 is formed into a right angle port at the top as shown. The air intake conduit 10 exits the housing through a sealed hole 13 as shown. The air intake conduit 10 has a connection nipple 14 which permits connection with vacuum hoses and the like (see e.g., FIG. 4). The bottom 15 of the air intake conduit 10 is open to the lower housing to permit the discharge of polluted, dusty air into the water 4.

Figure 7:
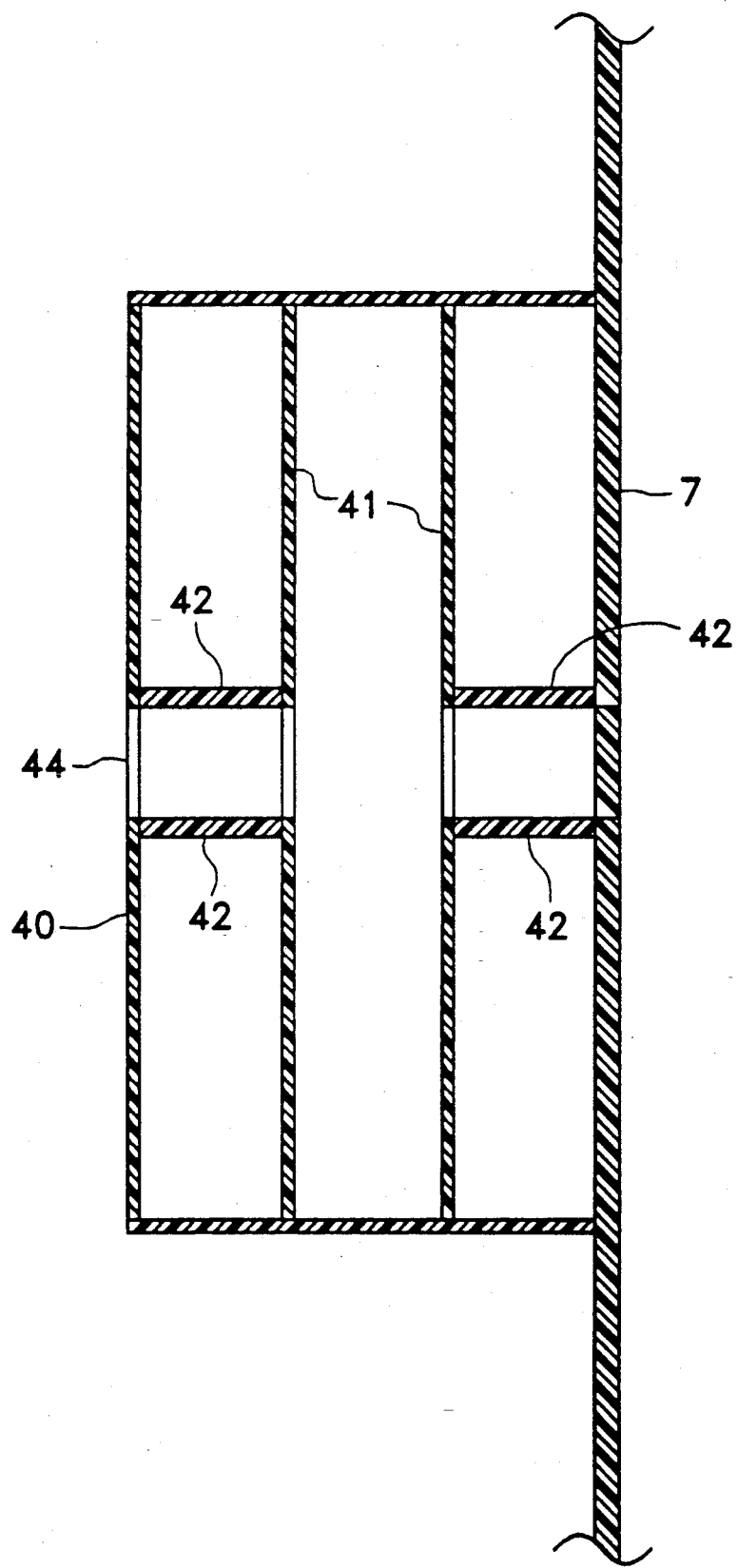
FIG. 7 is a detail view of the intake baffles.

Referring now to FIGS. 1, 2 and 7, two exhaust plenum intake baffles 40 are shown. These baffles 40 are positioned within the lower housing, above the water level. The baffles consist of plastic plates 41 that have holes 44 placed in their centers. These holes 44 act as air entry ports for the exhaust plenum, as discussed below. The plates 41 are held apart by spacers 42. The baffles are sealed about their perimeters to prevent entry of air. Once constructed, the baffles form a box like structure, that is open on the inside. The baffles are attached to the plenum as shown. An entry port 46 is placed into the plenum such that the air entry ports 44 in the baffles are in alignment with the port 46.

In this way, air is forced into the intake conduit, where it is forced out into the water. The air is then pulled upward from the water and into the baffles. The constriction of the baffles as compared to the housing and plenum, ensure a constant flow of air from the lower housing into the plenum. As the air is passed through the baffles into the exhaust plenum, water and dust particles will adhere to the plates 41, thereby cleaning the air further.

As discussed above, the housing, and plenum are designed as two separate pieces. This permits the housing to be separated for cleaning and to change the water, which is normally kept in the lower housing during use. A sealing plate 21 is provided to ensure an air tight seal is formed. This is important to prevent exit of polluted air before it has been cleaned, and to prevent the possibility of spilling water from the housing during use.

The lower exhaust plenum is connected to the upper exhaust plenum through a square connector joint 22. In use, the seal plate is placed over the lower housing, aligning the seal plate 21 to the lower exhaust plenum. The upper housing is then placed on top of the seal plate until the upper exhaust plenum mates with the connector joint 22. The housings are then pushed together and held together with clips 30 (see e.g., FIG. 1), which are placed on opposite sides of the housing connection to ensure a solid, airtight connection.

Once the air enters the exhaust plenum, it is forced upwards into the upper housing. Here, it passes over a conical trap 60. This trap consists of a cylindrical housing 61 that is closed at the bottom by a conical base 62. The trap is designed to be pulled upwards when the vacuum is in operation. This forces the air and water particles to flow around the trap, where the water particles adhere to the conical base 62 and become trapped. When the vacuum is removed, the water particles are free to fall downward into the lower portion of the unit, where they will not escape.

Two exit holes 63 are provided at the sides of the cylindrical housing 61 as shown. The cylindrical housing is suspended within the plenum to ensure uniform air flow around and through the trap 60.

After the air passes over the trap, it exits the exhaust plenum through exit port 65 into the upper chamber where it is drawn through a second set of baffles 70. These baffles are similar to those used in the lower chamber. Here, however, the baffles are designed to channel the air to two exhaust ports 75. The exhaust ports are located offset from the center of the rear of the upper housing 2. This is done to allow the device to be mounted on an upright vacuum cleaner frame. The handle of the cleaner typically runs through the center longitudinal axis of the device. Thus, a single entry port located in the center of the upper housing would probably be blocked by the cleaner's handle.

The multiple baffles and the trap further cleanse the exhaust air to the point where additional paper filters are not needed. The air that leaves the exhaust ports is clean and dust free.

In the preferred embodiment, the device is made of high strength plastic.

Referring now to FIG. 4, the device 1 is intended to be mounted on a standard upright vacuum handle 100 as shown. Two clips 101 and 102 secure the device to the handle. A hose 105 supplies the dirt from the cleaning head 106 to the device 1.

This device can also be used as an air filter that can be operated separately from a vacuum. All that is needed is to provide a source of vacuum, or some type of exhaust fan that will pull air through the device, and a source of polluted air. The air can be filtered as discussed above and exhausted into the supply air system.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An air filtering system comprising:
 a) a housing;
 b) a water containment means, formed within said housing to hold a quantity of water for filtering polluted air;
 c) an inlet conduit means, fixedly attached to said housing to direct entry of polluted air into said housing and into said water containment means;
 d) an exhaust conduit fixedly placed within said housing;
 e) at least one baffle assembly fixedly placed within said housing to direct air flow from the water containment means to the exhaust conduit; and
 f) an exhaust port, fixedly attached to said housing and in communication with said exhaust conduit to exhaust clean air emanating from said housing.

2. The device of claim 1 further comprising an exhaust baffle, fixedly placed within said housing between said exhaust conduit and said exhaust port such that the air flow must pass through said exhaust baffle before entering said exhaust port.

3. The device of claim 1 further comprising dust trap means, suspended within said exhaust conduit to further trap dust and water particles found in said exhaust conduit.

4. The device of claim 3 wherein said dust trap means comprises a conical member movably suspended within said exhaust conduit such that when a vacuum is applied to the device, the dust trap means is pulled upwardly, forming inner and outer air channels within said exhaust conduit and simultaneously sealing said inner air channel in the exhaust conduit means, thereby forcing the air stream over said conical section and through the outer air channel, thereby trapping any airborne water vapor droplets within said dust trap means; and when said vacuum is removed, said dust trap means is pulled downwardly by gravity, thereby releasing any water droplets collected on said dust trap means into said exhaust conduit.

5. The device of claim 1 wherein the device is attached to an upright vacuum cleaner frame.

6. An air filtering system comprising:
 a) a housing;
 b) a water containment means, formed within said housing to hold a quantity of water for filtering polluted air;
 c) an inlet port, fixedly attached to said housing to direct entry of polluted air into said housing;

d) an air inlet conduit means, fixedly placed within said housing to direct polluted air into said water containment means;

e) an exhaust conduit fixedly placed within said housing;

f) at least one intake baffle assembly fixedly placed within said housing to direct air flow from the water containment means to the exhaust conduit;

g) an exhaust port, fixedly attached to said housing to exhaust clean air emanating from said housing; and h) at least one exhaust baffle, fixedly placed within said housing between said exhaust conduit and said exhaust port such that the air flow must pass through said exhaust baffle before entering said exhaust port.

7. The device of claim 6 further comprising dust trap means, suspended within said exhaust conduit to further trap dust and water particles found in said exhaust conduit.

8. The device of claim 7 wherein said dust trap means comprises a conical member movably suspended within said exhaust conduit such that when a vacuum is applied to the device, the dust trap means is pulled upwardly, forming inner and outer air channels within said exhaust conduit and simultaneously sealing said inner air channel in the exhaust conduit means, thereby forcing the air stream over said conical section and through the outer air channel, thereby trapping any airborne water vapor droplets within said dust trap means; and when said vacuum is removed, said dust trap means is pulled downwardly by gravity, thereby releasing any water droplets collected on said dust trap means into said exhaust conduit.

9. The device of claim 6 wherein the device is attached to an upright vacuum cleaner frame.

10. An air filtering system comprising:

a) a housing;

b) a water containment means, formed within said housing to hold a quantity of water for filtering polluted air;

c) an inlet port, fixedly attached to said housing to direct entry of polluted air into said housing;

d) an air inlet conduit means, fixedly placed within said housing to direct polluted air into said water containment means;

e) an exhaust conduit fixedly placed with said housing;

f) at least one intake baffle assembly fixedly placed within said housing to direct air flow from the water containment means to the exhaust conduit;

g) an exhaust port, fixedly attached to said housing to exhaust clean air emanating from said housing;

h) at least one exhaust baffle, fixedly placed within said housing between said exhaust conduit and said exhaust port such that the air flow must pass through said exhaust baffle before entering said exhaust port; and i) a dust trap means having a conical member movably suspended within said exhaust conduit such that when a vacuum is applied to the device, the dust trap means is pulled upwardly, forming inner and outer air channels within said exhaust conduit and simultaneously sealing said inner air channel in the exhaust conduit means, thereby forcing the air stream over said conical section and through the outer air channel, thereby trapping any airborne water vapor droplets within said dust trap means; and when said vacuum is removed, said dust trap means is pulled downwardly by gravity, thereby releasing any water droplets collected on said dust trap means into said exhaust conduit.

11. The device of claim 10 wherein the device is attached to an upright vacuum cleaner frame.

* * * * *